United States Patent [19]

Nicholson

[11] Patent Number: 4,585,239
[45] Date of Patent: Apr. 29, 1986

[54] CHANNELED RING SEALS WITH SPRING RINGS

[76] Inventor: Terence P. Nicholson, Calf Hall, Muggleswick, Derwentside, Co. Durham, England

[21] Appl. No.: 772,568

[22] Filed: Sep. 4, 1985

[30] Foreign Application Priority Data

Sep. 5, 1984 [GB] United Kingdom ............... 8422359

[51] Int. Cl.⁴ .............................................. F16J 15/12
[52] U.S. Cl. .................................. 277/205; 277/227; 277/235 R
[58] Field of Search ............... 277/205, 206 R, 206 A, 277/157, 164, 165, 227, 166, 228, 235 R, 152

[56] References Cited

U.S. PATENT DOCUMENTS

| | | | |
|---|---|---|---|
| 1,871,299 | 8/1932 | Bragg et al. | 277/206 X |
| 2,326,489 | 8/1943 | Payne | 277/84 X |
| 3,114,561 | 12/1963 | Creath et al. | 277/205 X |
| 3,301,568 | 1/1967 | Perry | 277/206 X |
| 3,414,276 | 12/1968 | Faccou et al. | 277/206 X |

FOREIGN PATENT DOCUMENTS 2310365 11/1973 Fed. Rep. of Germany ...... 277/205

Primary Examiner—Robert S. Ward
Attorney, Agent, or Firm—Fidelman, Wolffe & Waldron

[57] ABSTRACT

A ring seal primarily for sealing static mating faces comprises an annular jacket (1), which may be made of low friction plastics material, having a channel of part-elliptical radial profile. Within the channel there is accommodated an energizing spring (2) in the form of a ring of channel-shaped radial profile, there being a gap between a part (M) of the spring ring (2) and the channel to allow movement of the spring ring relative to the jacket when the ring seal is brought into use. The spring ring (2) is made from a transversely folded strip of metal with segmented side edges which is formed into a circle and then has its ends secured together.

3 Claims, 9 Drawing Figures

CHANNELED RING SEALS WITH SPRING RINGS

This invention relates to ring seals of the kind comprising an annular jacket of relatively yieldable material which is of channel shaped radial cross-section and to which resilience is imparted by an internal energising spring ring which is located in the channel. The jacket may be made of material having a low friction co-efficient such as Teflon (Registered Trade Mark). The spring may be made of either metal or elastomer in various configurations. It may thus be of helically coiled construction or of channel shaped radial cross-section.

Such ring seals may be used as static seals, that is to say for sealing between two static plane mating faces or as dynamic seals that is to say for sealing, externally or internally, reciprocating or rotating shafts in relation to adjacent tubes, casings or the like.

The present invention is concerned with static ring sealing and has been devised with the object of providing an informed static ring seal of the kind referred to which is less liable to failure by metal spring fatigue or dislodgement of the spring from the jacket.

A preferred embodiment of the invention and its mode of manufacture are hereinafter described by reference to the accompanying drawings in which.

Figure 1:
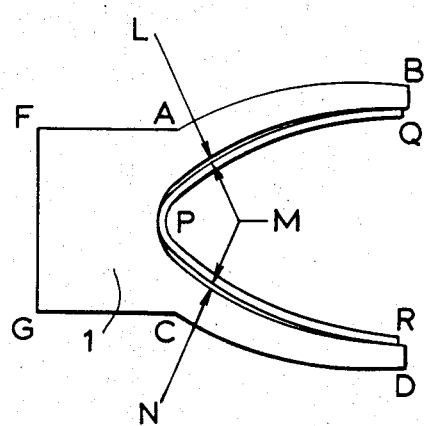
FIG. 1 is a radial cross-section of the improved ring seal.

Referring firstly to FIG. 1, the ring seal for static sealing purposes is circular and comprises an outer jacket 1 which is machined from Teflon. This jacket comprises a heel part FAGC and channel-forming lips ABQP and CDRP which together in radial section are inwardly of semi-elliptical profile. The thickness FG of the heel part should be very slightly less than the depth of the recess in which it is to be fitted so that it is not subjected to any face load. Initial sealing occurs at points B and D with the sealing area increasing from B to A and D to C as compression is increased.

In order that the ring seal shall operate successfully under a wide variety of working conditions, for instance temperature and pressure cycling, there is accommodated in the semi-elliptical profile channel an annular spring 2 which is of novel cross-sectional shape and construction which is hereafter described. To enable this spring to be fitted into the channel of the jacket 1 it is manufactured in the form of a strip which is deformed into a circle and it's ends welded together after fitting.

Figure 2:
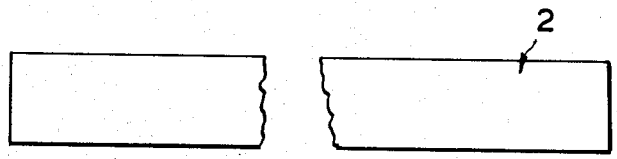
FIGS. 2 to 7 illustrate successive stages in the manufacture of its energising spring element.

FIG. 2 shows a strip 2 of required length, width and thickness made of any suitable resilient material such as phosphor bronze, spring steel, stainless steel or Inconel or Nimonic high nickel alloys, depending upon the intended operational environment. Preferably the strip is cut from sheet metal rather than extended strip because it is more beneficial if the grain of the metal is inclined between 45° and 90° to the length of the strip.

Figure 3:
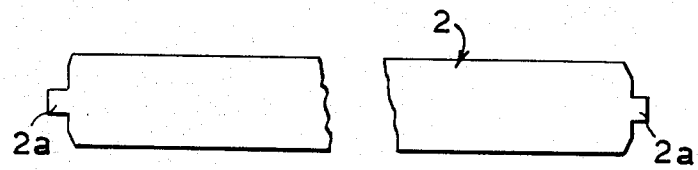

The corners of the strip are now modified as shown in FIG. 3 to form at each end of the strip a rectangular central lug 2a.

Figure 4:
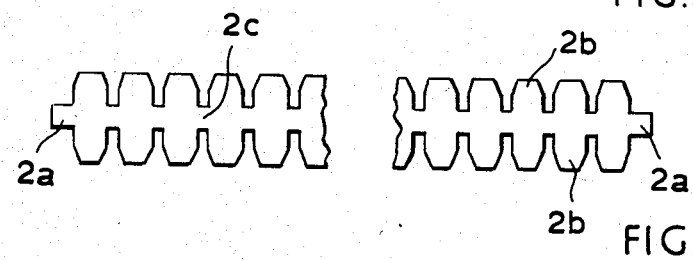

Next, as shown in FIG. 4, the strip is cut to form along each side edge a plurality of slightly spaced teeth 2b. The faces of the strip are then lapped to remove burrs and imperfections.

Figure 5:
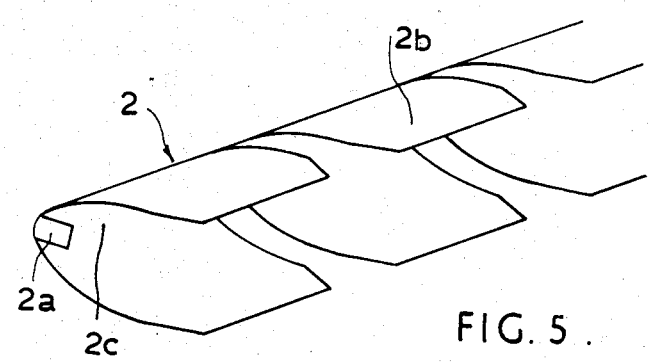
Figure 6:
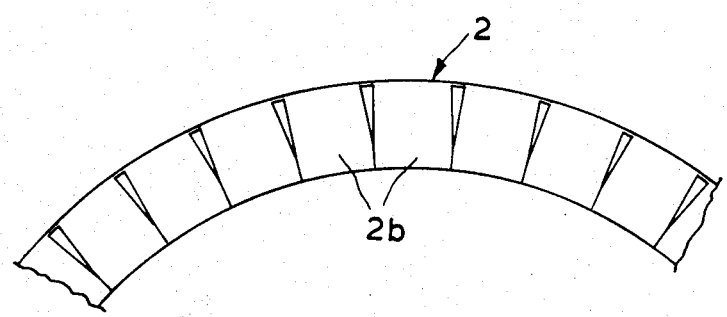

Next, as shown in FIG. 5, the strip 2 is bent transversely until it is of modified semi-elliptical cross-sectional profile with a flat spine 2c and the lugs 2a are turned at right angles to the longitudinal axis of the strip. The strip 2 is then formed into a circle as indicated fragmentarily in FIG. 6. The spine 2c becomes circular and the free ends of adjacent teeth 2b make contact with one another.

It is essential that the strip is formed into a true circle by rolling circumferentially so that the segments 2b present spherical surfaces both axially and circumferentially rather than a series of flat segments. This achieves a double spring action by using both the natural hardness of the metal and the natural hoop strength due to the curvature of the segments to achieve maximum resilience characteristics without introducting metal fatigue problems.

Figure 7:
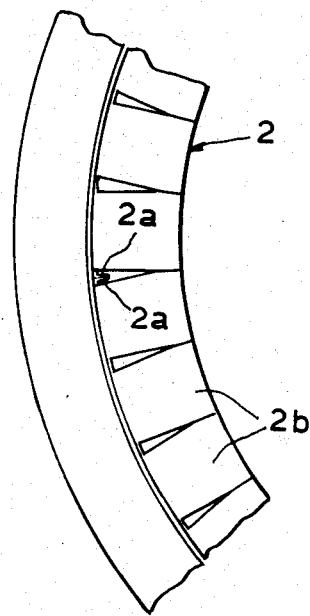
Figure 8:
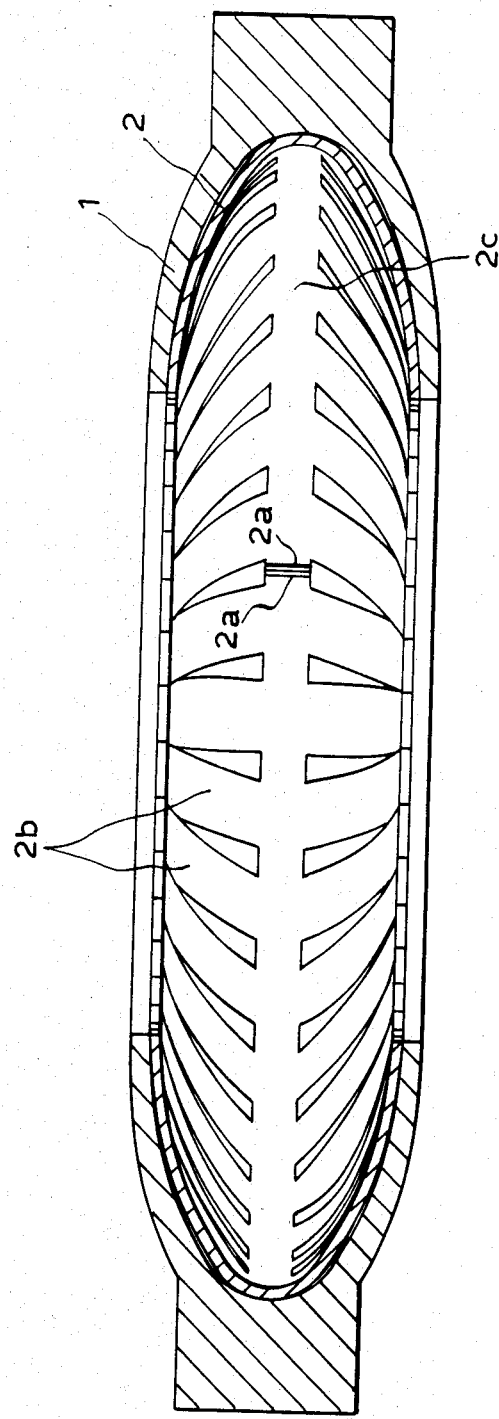
FIG. 8 is a diametric section through the finished ring seal.
Figure 9:
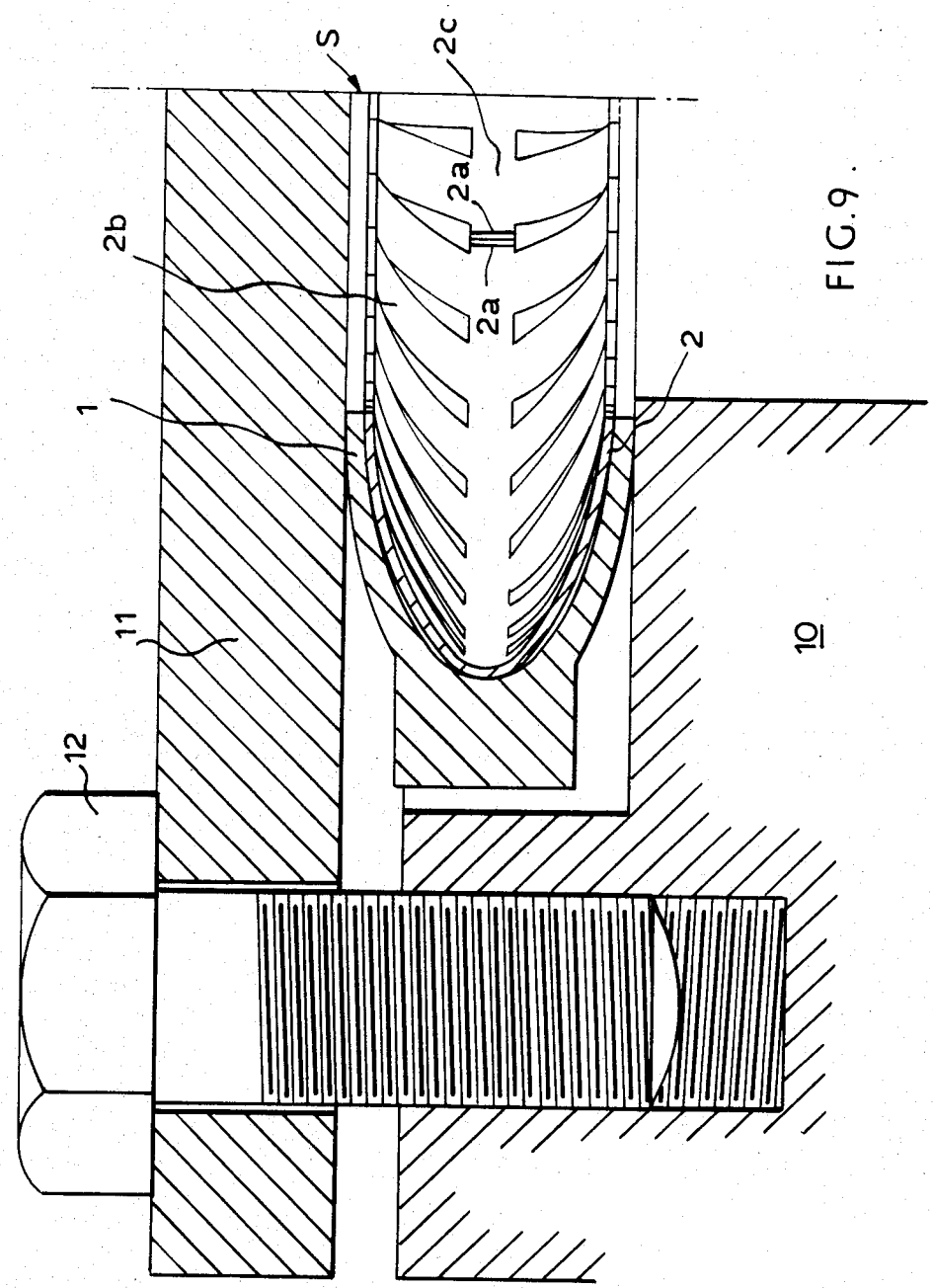
FIG. 9 is a radial section of the ring seal in a pre-operative state.

The spring is then heat treated and afterwards (when necessary) age-hardened. Finally the spring 2 is fitted into the channel of the jacket 1 and the lugs 2a are welded together as shown in FIG. 7. The complete ring seal then has, in diametric section, the appearance shown in FIG. 8. FIG. 9 shows a ring seal S manufactured by the method already described and in position for sealing the joint between a body 10 and a flange 11 before the ring seal has been compressed by tightening a series of studs such as 12.

Reverting to FIG. 1, it is to be noted that there are spaces LM and MN between the outside of the spring 2 and the adjacent inside surfaces of the jacket 1. The reason for this is that during compression of the ring seal the points L and N of the jacket 1 approach one another whereas the separation of the points M of the spring 2 increases. This space is therefore essential to ensure that the spring is not inhibited from performing in the intended manner.

As the ring seal radial section increases in size, the thickness of the metal for the spring should be increased in proportion and similarly as the diameter of the ring seal increases the width of the segments 2b must be increased in proportion to maintain a constant seal surface loading.

Seals in accordance with the invention as defined in the appended claims can be tailored to suit various operational requirements within the material limits regardless of whether there is likelihood of flange distortion or temperature and pressure cycling.

I claim:

1. A ring seal of the kind referred to, characterised in that a channel in an annular jacket is of substantially part-elliptical radial profile and contains a spring ring of channel-shaped radial profile comprised of a transversely folded strip of metal with segmented side edges which is formed into a circle and has its ends secured together, there being a gap between a part of the spring ring and the channel in the jacket to allow movement of the spring ring relative to the jacket when the ring seal is brought into use.

2. A ring seal as claimed in claim 1 wherein the ends of the strip are formed with radial lugs which are secured together by welding.

3. A ring seal as claimed in claim 1 wherein the spring ring is part-elliptical in radial profile.

* * * * *